F. J. MANN.
BLOW TORCH AND SOLDERING IRON.
APPLICATION FILED MAR. 19, 1909.
937,622.
Patented Oct. 19, 1909.
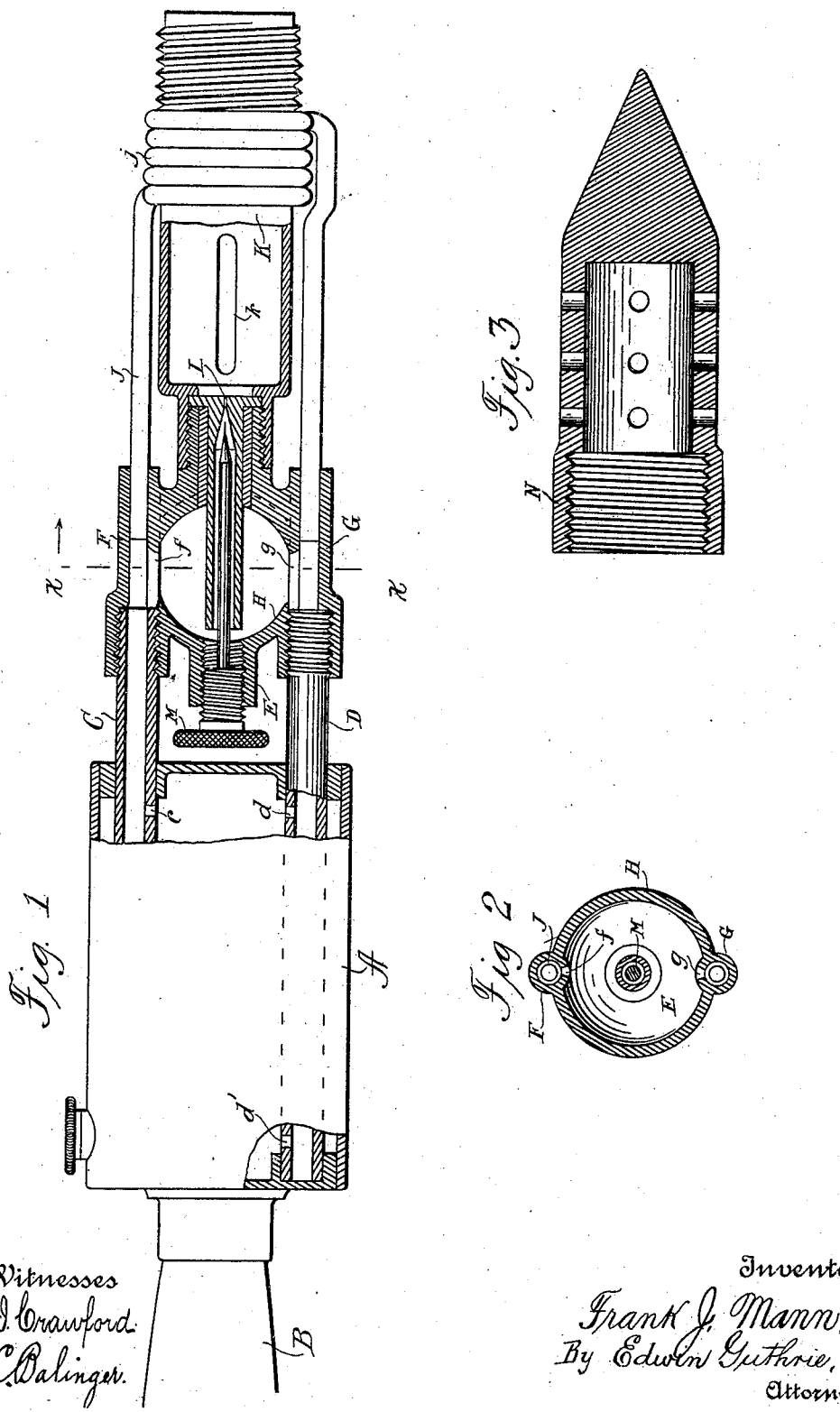

UNITED STATES PATENT OFFICE.

FRANK J. MANN, OF NEW YORK, N. Y., ASSIGNOR TO FRANK J. MANN TOOL AND APPLIANCE COMPANY, OF NEW YORK, N. Y., A CORPORATION OF NEW YORK.

BLOW-TORCH AND SOLDERING-IRON.

937,622. Specification of Letters Patent. Patented Oct. 19, 1909.

Application filed March 19, 1909. Serial No. 484,370.

*To all whom it may concern:*

Be it known that I, FRANK J. MANN, citizen of the United States, residing at New York, in the county of New York and State of New York, have invented certain new and useful Improvements in Blow-Torches and Soldering-Irons, of which the following is a specification.

This invention relates to blow torches and soldering irons which are provided with reservoirs to contain liquid fuel, and devices for burning the fuel and constantly heating the irons as long as the fuel lasts.

The object of this invention is the production of a self-heating soldering iron and blow torch wherein the parts have special construction and particular arrangement, believed to be more conveniently operated, and more economically manufactured and assembled, than is the case with those similar devices with which I am acquainted.

The construction and arrangement constituting this invention, are set forth in the accompanying drawings, of which—

Figure 1 represents a longitudinal section of all the parts assembled. Fig. 2 is a cross-section of the coupling on line $x$—$x$ of Fig. 1. Fig. 3 is a section lengthwise of the soldering iron.

The same letters are used to refer to the same parts throughout the specification and drawings.

A reservoir A has suitably secured to one end or head, a handle B. Through the opposite end of the reservoir pass two relatively stiff tubes C and D. The tubes have openings within the reservoir. One of the openings $c$ in tube C is shown, and two openings $d$ and $d'$ are shown in tube D. The two tubes C and D mentioned, are secured to the coupling E, as shown. The coupling E has two diametrically opposite tubular portions F and G, and a hollow, spherical body portion H. The tubular portions F and G of the coupling open into the body portion by way of the slots $f$ and $g$.

In Fig. 1 it is illustrated that a continuous tube J extends from the tubular portion F of the coupling E and is bent into a coil $j$ around the hollow torch K, and returns to the tubular portion G of the coupling. The torch K is provided with openings, one of which is shown and marked $k$. A jet tube L is arranged in communication with the torch cylinder K, and extends in the direction of the handle the greater part of the distance across the interior of the spherical portion of the coupling E. The jet orifice of the tube L is governed in the customary manner by the needle cleaner-valve M, the milled head of which is shown as located between the tubes C and D.

A hollow-perforated soldering iron N, as shown in Fig. 3 may be screwed on to the threaded end of the torch K, as plainly indicated by the drawings, when the tool is to be used for soldering purposes.

The operation of this invention consists in applying heat to the coil $j$, opening the valve M and igniting the fluid escaping through the jet orifice of tube L. The coil is thus kept heated and the fluid vaporized. The necessary air enters by way of openings $k$ in the torch K. When the reservoir A is filled, the fluid enters the tubes C and D. It fills the interior of the coupling E and the continuous tube J of which coil $j$ forms a part. When this invention is used in a horizontal or downwardly-inclined position, the fluid flows by gravity into the coil $j$ and the operation is thus kept up. When, however, the invention is held with the torch or iron uppermost, the intensity of the combustion would soon decrease were it not for the fact that the hollow interior of the coupling contains a quantity of the fluid and it is near enough to the heated parts to be fully vaporized as needed, even though the invention be held for some time in a vertical attitude. It is with the view of using as nearly as possible all the fluid contents of the spherical interior of the coupling E, that the jet tube L is extended as previously stated almost all the way across the interior of the coupling. Thus, when the invention is vertical, the tube L extends almost to the bottom of the spherical cavity of the coupling.

It is believed to be now made out that this invention is well adapted for use on work making it necessary for the iron or torch to be held upright.

Having now described this invention, and explained the mode of its operation, what I claim is:—

1. In a blow torch and soldering iron, the combination with a reservoir, of a hollow coupling, tubes connecting the coupling and reservoir, a torch connected with the said coupling, a tube connected with the coupling and provided with a coil encircling the torch, a jet tube communicating with the coupling and torch, and a needle valve governing the orifice of the jet tube.

2. In a blow torch and soldering iron, the combination with a reservoir, of a hollow coupling, tubes connecting the coupling and reservoir, a torch connected with the said coupling, a tube connected with the coupling and provided with a coil encircling the torch, a jet tube communicating with the torch and extending the greater part of the distance across the interior of the coupling, and a needle valve governing the orifice of the jet tube.

3. In a blow torch, the combination with a hollow coupling, of a reservoir, tubes connecting the reservoir and the coupling, a torch connected with the coupling, a tube extending from one side of the coupling and returning to the other side of the coupling, a portion of the said tube being arranged in proximity to the torch, the said coupling having a jet tube opening into the torch, and a needle valve adapted to open and close the orifice of the jet tube.

4. In a blow torch, the combination with a hollow coupling, of a reservoir, tubes connecting the reservoir and the coupling, a torch connected with the coupling, a tube extending from one side of the coupling and returning to the other side of the coupling, a portion of the said tube being arranged in proximity to the torch, the said coupling having a jet tube opening into the torch, the said jet tube extending backwardly into the hollow interior of the coupling, and a needle valve adapted to open and close the orifice of the jet tube.

In testimony whereof I affix my signature in presence of two witnesses.

FRANK J. MANN.

Witnesses:
  CHARLES M. VILLONE,
  JAS. R. VACCARELLI.